United States Patent
He et al.

(10) Patent No.: US 11,526,241 B2
(45) Date of Patent: Dec. 13, 2022

(54) FLEXIBLE SUBSTRATE, TOUCH DISPLAY SUBSTRATE, MANUFACTURING METHODS THEREOF, AND TOUCH DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Jianjun He, Beijing (CN); Liqiang Chen, Beijing (CN); Li Deng, Beijing (CN); Tao Wang, Beijing (CN); Sehyuck Park, Beijing (CN)

(73) Assignees: Beijing BOE Technology Development Co., Ltd., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 542 days.

(21) Appl. No.: 16/062,313

(22) PCT Filed: Nov. 6, 2017

(86) PCT No.: PCT/CN2017/109460
§ 371 (c)(1),
(2) Date: Jun. 14, 2018

(87) PCT Pub. No.: WO2018/176838
PCT Pub. Date: Oct. 4, 2018

(65) Prior Publication Data
US 2020/0363904 A1    Nov. 19, 2020

(30) Foreign Application Priority Data
Mar. 31, 2017  (CN) .......................... 201710207080.1

(51) Int. Cl.
*G06F 3/044*    (2006.01)
*G06F 3/041*    (2006.01)

(52) U.S. Cl.
CPC ........ *G06F 3/0443* (2019.05); *G06F 3/04164* (2019.05); *G06F 2203/04102* (2013.01); *G06F 2203/04103* (2013.01)

(58) Field of Classification Search
CPC .............. G06F 3/0443; G06F 3/04164; G06F 2203/04102; G06F 2203/04103
See application file for complete search history.

(56) References Cited

U.S. PATENT DOCUMENTS

2010/0302206 A1    12/2010  Yu et al.
2017/0262112 A1*   9/2017   Noguchi ............. G02F 1/13338

FOREIGN PATENT DOCUMENTS

CN      106020551 A     10/2016
CN      106125986 A  *  11/2016
(Continued)

OTHER PUBLICATIONS

English translation of International Search Report and English translation of Box V of Written Opinion, for International Application No. PCT/CN2017/109460, dated Feb. 11, 2018, 13 pages.

*Primary Examiner* — Amare Mengistu
*Assistant Examiner* — Jennifer L Zubajlo
(74) *Attorney, Agent, or Firm* — Westman, Champlin & Koehler, P.A.

(57) ABSTRACT

A flexible substrate, a touch display substrate, manufacturing methods thereof, and a touch display device are provided. The flexible substrate includes: a first flexible base substrate; a first buffer layer arranged on the first flexible base substrate; a first pressure sensing electrode arranged on the first buffer layer; and a second flexible base substrate covering the first pressure sensing electrode. The first pressure sensing electrode is capable of forming a pressure (Continued)

sensing capacitor with a second pressure sensing electrode arranged at a side of the second flexible base substrate away from the first pressure sensing electrode.

11 Claims, 4 Drawing Sheets

(56) References Cited

FOREIGN PATENT DOCUMENTS

| | | | |
|---|---|---|---|
| CN | 106125986 A | | 11/2016 |
| CN | 106206981 A | * | 12/2016 |
| CN | 106206981 A | | 12/2016 |
| CN | 106406627 A | | 2/2017 |
| CN | 106445250 A | | 2/2017 |
| CN | 106775134 A | | 5/2017 |

* cited by examiner

FLEXIBLE SUBSTRATE, TOUCH DISPLAY SUBSTRATE, MANUFACTURING METHODS THEREOF, AND TOUCH DISPLAY DEVICE

CROSS-REFERENCE TO RELATED APPLICATIONS

The present application is the U.S. national phase of PCT Application No. PCT/CN2017/109460 filed on Nov. 6, 2017, which claims a priority of the Chinese patent application No.201710207080.1 filed on Mar. 31, 2017, which are incorporated herein by reference in their entireties.

TECHNICAL FIELD

The present disclosure relates to the field of touch display technology, in particular to a flexible substrate, a touch display substrate, manufacturing methods thereof, and a touch display device.

BACKGROUND

Force touch technology, with an additional Z-axis (pressing) dimension on the basis of original two dimensions (i.e., X-axis and Y-axis dimensions) has been widely used nowadays. When this technology is applied to a smart terminal, it is able to provide many second-level and/or third-level submenus at an operational interfaces of the smart terminal, thereby to enter these submenus rapidly by pressing with fingers.

Usually, for the force touch technology, a force touch sheet is attached under a display panel and connected to a flexible printed circuit board (FPCB). The force touch sheet needs to be purchased separately and attached onto the display panel, and then a connection state thereof needs to be checked. Hence, the entire procedure is complex and meanwhile a resultant touch display product has a relatively large thickness.

SUMMARY

An object of the present disclosure is to provide a flexible substrate, a touch display substrate, manufacturing methods thereof and a touch display device, so as to provide the touch display substrate integrated with a pressure sensing function, and simplify the assembling of the touch display product.

In one aspect, the present disclosure provides in some embodiments a flexible substrate, including: a first flexible base substrate; a first buffer layer arranged on the first flexible base substrate; a first pressure sensing electrode arranged on the first buffer layer; and a second flexible base substrate covering the first pressure sensing electrode. The first pressure sensing electrode is capable of forming a pressure sensing capacitor with a second pressure sensing electrode arranged at a side of the second flexible base substrate away from the first pressure sensing electrode.

In a possible embodiment of the present disclosure, the flexible substrate further includes a second buffer layer covering the first pressure sensing electrode, and the second flexible base substrate is arranged on the second buffer layer.

In another aspect, the present disclosure provides in some embodiments a method for manufacturing a flexible substrate, including steps of: forming a first flexible base substrate on a rigid carrier; forming a first buffer layer on the first flexible base substrate; forming a first pressure sensing electrode on the first buffer layer; and forming a second flexible base substrate covering the first pressure sensing electrode.

In a possible embodiment of the present disclosure, prior to the step of forming the second flexible base substrate covering the first pressure sensing electrode, the method further includes forming a second buffer layer covering the first pressure sensing electrode. The step of forming the second flexible base substrate covering the first pressure sensing electrode includes forming the second flexible base substrate on the second buffer layer.

In a possible embodiment of the present disclosure, the method further includes removing the rigid carrier.

In yet another aspect, the present disclosure provides in some embodiments a touch display substrate including: the above-mentioned flexible substrate; and at least one of a display function layer or a touch electrode layer arranged on the flexible substrate.

In a possible embodiment of the present disclosure, the touch display substrate further includes a second pressure sensing electrode capable of forming a pressure sensing capacitor with the first pressure sensing electrode.

In a possible embodiment of the present disclosure, the first pressure sensing electrode and the second pressure sensing electrode are arranged at two sides of the second flexible base substrate respectively.

In a possible embodiment of the present disclosure, the display function layer includes a thin film transistor (TFT) and an organic light-emitting layer, and a display voltage signal line connected to the TFT is electrically connected to the first pressure sensing electrode through a via-hole.

In still yet another aspect, the present disclosure provides in some embodiments a method for manufacturing a touch display substrate, including steps of: forming a flexible substrate using the above-mentioned method; and forming a display function layer on the flexible substrate.

In a possible embodiment of the present disclosure, the method further includes forming a touch electrode layer on the display function layer.

In a possible embodiment of the present disclosure, the display function layer includes a TFT and an organic light-emitting layer. The step of forming the display function layer on the flexible substrate includes: forming a third buffer layer on the flexible substrate; forming an active layer of the TFT on the third buffer layer; forming a gate insulation layer; forming a gate electrode of the TFT on the gate insulation layer; forming an intermediate insulation layer; forming a via-hole in the intermediate insulation layer to expose at least one of the first pressure sensing electrode or a lead of the first pressure sensing electrode; and forming a source electrode and a drain electrode of the TFT and a display voltage signal line on the intermediate insulation layer, the display voltage signal line being electrically connected to the first pressure sensing electrode through the via-hole.

In still yet another aspect, the present disclosure provides in some embodiments a touch display device including the above-mentioned touch display substrate and a display driving circuit for providing a display voltage signal to the touch display substrate.

In a possible embodiment of the present disclosure, a display voltage signal line connected to a TFT of a display function layer is electrically connected to a first pressure sensing electrode through a via-hole, and the display driving circuit is multiplexed as a pressure sensing circuit capable of providing a pressure sensing voltage signal to the first pressure sensing electrode.

DETAILED DESCRIPTION OF THE EMBODIMENTS

In order to make the technical problems, the technical solutions and the advantages of the present disclosure more apparent, the present disclosure will be described hereinafter in a clear and complete manner in conjunction with the drawings and embodiments.

Figure 1:
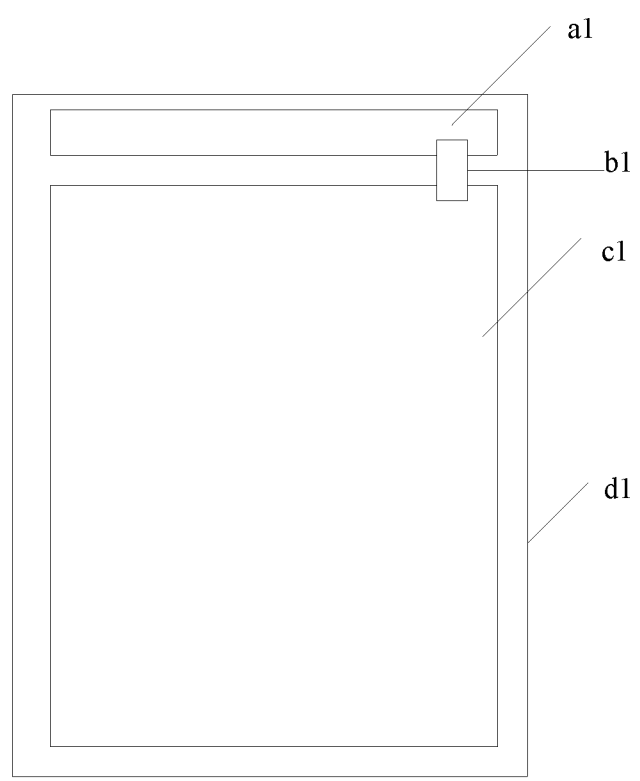
FIG. 1 is a schematic view showing a force touch sheet attached under a display panel and connected to an FPCB in the related art.

As shown in FIG. 1, for a force touch technology, usually a force touch sheet c1 is attached under a display panel d1 and connected to a FPCB a1 via a connector b1. The force touch sheet c1 needs to be purchased separately and attached onto the display panel d1, and then a connection state thereof needs to be checked. Hence, the entire procedure is complex and meanwhile a resultant touch display product has a relatively large thickness.

An object of the present disclosure is to provide a flexible substrate, a touch display substrate, manufacturing methods thereof and a touch display device, so as to provide the touch display substrate integrated with a pressure sensing function, and simplify the assembling of the touch display product.

The present disclosure provides in some embodiments a flexible substrate, including: a first flexible base substrate; a first buffer layer arranged on the first flexible base substrate; a first pressure sensing electrode arranged on the first buffer layer; and a second flexible base substrate covering the first pressure sensing electrode. The first pressure sensing electrode is capable of forming a pressure sensing capacitor with a second pressure sensing electrode arranged at a side of the second flexible base substrate away from the first pressure sensing electrode.

According to the flexible substrate in the embodiments of the present disclosure, the pressure sensing electrode is arranged between the two flexible base substrates, and a display function layer and/or a touch electrode layer are formed on the flexible substrate, so as to achieve a touch function, a pressure sensing function and a display function at the same time, provide a touch display substrate integrated with the pressure sensing function, and simplify the manufacture and assembling of a touch display product.

Each of the first flexible base substrate and the second flexible base substrate may be made of polyimide (PI), and may have a thickness of 50000Å to 100000Å. The first buffer layer may be a SiNx layer, a SiOx layer or a combination thereof, and it may have a thickness of 4000Å. The first pressure sensing electrode may be a metal layer or a transparent conductive layer, and the metal layer may be made of molybdenum (Mo), aluminium (Al), titanium (Ti) or a combination thereof and have a thickness of about 2000Å. The first pressure sensing electrode may be formed by the metal layer through a patterning process.

When forming the second flexible base substrate, a lead of the first pressure sensing electrode needs to be exposed, so as to enable the lead to be electrically connected to a pressure sensing circuit subsequently.

In a possible embodiment of the present disclosure, the flexible substrate further includes a second buffer layer covering the first pressure sensing electrode, and the second flexible base substrate is arranged on the second buffer layer.

Through the second buffer layer, it is able to provide a flat surface for the subsequent manufacture process. A flexible material may be coated onto the second buffer layer to form the second flexible base substrate, and the second buffer layer may be made of a material same as the first buffer layer.

The present disclosure further provides in some embodiments a method for manufacturing a flexible substrate, including steps of: forming a first flexible base substrate on a rigid carrier; forming a first buffer layer on the first flexible base substrate; forming a first pressure sensing electrode on the first buffer layer; and forming a second flexible base substrate covering the first pressure sensing electrode.

After that, the first flexible base substrate is peeled off from the rigid carrier.

According to the method in the embodiments of the present disclosure, the pressure sensing electrode is arranged between the two flexible base substrates, and a display function layer and/or a touch electrode layer are formed on the flexible substrate, so as to achieve a touch function, a pressure sensing function and a display function at the same time, provide a touch display substrate integrated with the pressure sensing function, and simplify the manufacture and assembling of a touch display product.

Each of the first flexible base substrate and the second flexible base substrate may be made of polyimide (PI), and may have a thickness of 50000Å to 100000Å. The first buffer layer may be a SiNx layer, a SiOx layer or a combination thereof, and it may have a thickness of 4000Å. The first pressure sensing electrode may be a metal layer or a transparent conductive layer, and the metal layer may be made of molybdenum (Mo), aluminium (Al), titanium (Ti) or a combination thereof and have a thickness of about 2000Å. The first pressure sensing electrode may be formed by the metal layer through a patterning process.

When forming the second flexible base substrate, a lead of the first pressure sensing electrode needs to be exposed, so as to enable the lead to be electrically connected to a pressure sensing circuit subsequently.

In a possible embodiment of the present disclosure, prior to the step of forming the second flexible base substrate covering the first pressure sensing electrode, the method further includes forming a second buffer layer covering the first pressure sensing electrode. At this time, the step of forming the second flexible base substrate covering the first pressure sensing electrode includes forming the second flexible base substrate on the second buffer layer.

Through the second buffer layer, it is able to provide a flat surface for the subsequent manufacture process. A flexible material may be coated onto the second buffer layer to form the second flexible base substrate, and the second buffer layer may be made of a material same as the first buffer layer.

The present disclosure further provides in some embodiments a touch display substrate, including the above-mentioned flexible substrate and a display function layer and/or a touch electrode layer arranged on the flexible substrate.

According to the touch display substrate in the embodiments of the present disclosure, the pressure sensing electrode is arranged between the two flexible base substrates, and the display function layer and/or the touch electrode layer are formed on the flexible substrate, so as to achieve a touch function, a pressure sensing function and a display function at the same time, provide a touch display substrate integrated with the pressure sensing function, and simplify the manufacture and assembling of a touch display product.

In a possible embodiment of the present disclosure, the touch display substrate further includes a second pressure sensing electrode capable of forming a pressure sensing capacitor with the first pressure sensing electrode. When the touch display substrate is pressed by a finger, a layer between the second pressure sensing electrode and the first pressure sensing electrode may be deformed, and a distance between the second pressure sensing electrode and the first pressure sensing electrode is changed so that a capacitance of the pressure sensing capacitor may change. As a result, it is able to detect a size of a force applied to the touch display substrate, thereby to achieve the pressure sensing function.

Any existing electrode on the touch display substrate, e.g., a ground shielding electrode, may be multiplexed as the second pressure sensing electrode. In this way, it is unnecessary to form the second pressure sensing electrode through a specific manufacture process, thereby to reduce the steps for manufacturing the touch display substrate and simplify the structure of the touch display substrate.

In a possible embodiment of the present disclosure, the display function layer includes a TFT and an organic light-emitting layer, and a display voltage signal line connected to the TFT is electrically connected to the first pressure sensing electrode through a via-hole. In this way, the TFT is connected to the first pressure sensing electrode via the display voltage signal line, and meanwhile a pressure sensing circuit is integrated into a display driving circuit. During a subsequent bonding process, it is able for the pressure sensing circuit and the display driving circuit to be electrically connected to the touch display substrate merely through a single bonding operation.

To be specific, the display voltage signal line may be connected to the lead of the first pressure sensing electrode, or directly connected to the first pressure sensing electrode.

Of course, the first pressure sensing electrode may not be connected to the display voltage signal line, and instead, a specific signal line may be connected to the first pressure sensing electrode when forming the TFT.

Figure 2:
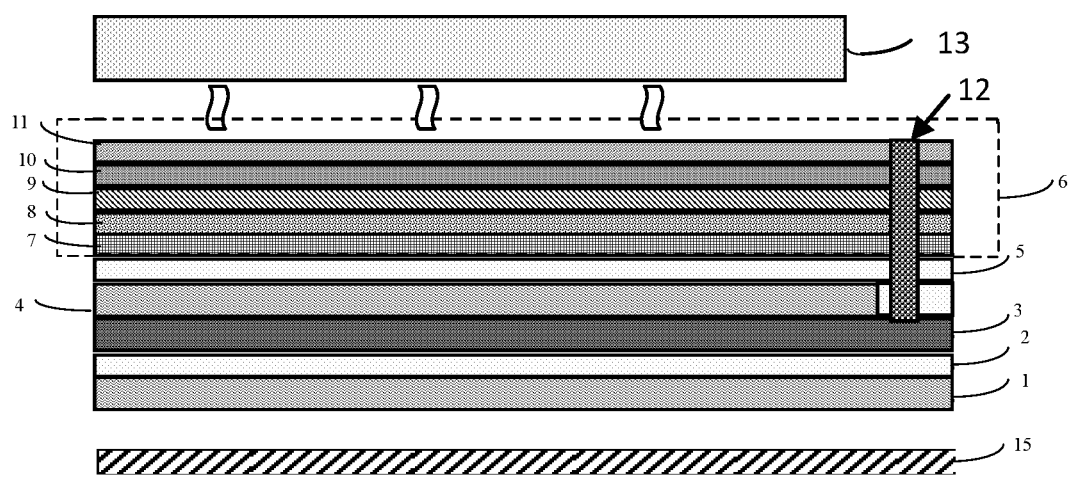
FIG. 2 is a schematic view showing a touch display substrate according to one embodiment of the present disclosure.

To be specific, as shown in FIG. 2, the touch display substrate includes: a first flexible base substrate 1; a first buffer layer 2 arranged on the first flexible base substrate 1; a first pressure sensing electrode 3 arranged on the first buffer layer 2; a second buffer layer 4 covering the first pressure sensing electrode 3; a second flexible base substrate 5; and a TFT array layer 6 arranged on the second flexible base substrate 5, and an organic light-emitting layer and a touch electrode layer 13 arranged on the TFT array layer 6.

The TFT array layer 6 includes an active layer 7, a gate insulation layer 8, a gate metal layer 9, an intermediate insulation layer 10 and a source-drain metal layer 11. The source-drain metal layer 11 is connected to the first pressure sensing electrode 3 via a conductive connection line 12, so that the display voltage signal line made of the source-drain metal layer 11 is connected to the first pressure sensing electrode.

The touch display substrate further includes a second pressure sensing electrode 15 capable of forming a pressure sensing capacitor with the first pressure sensing electrode. When the touch display substrate is pressed by a finger, a layer between the second pressure sensing electrode and the first pressure sensing electrode may be deformed, and a distance between the second pressure sensing electrode and the first pressure sensing electrode is changed so that a capacitance of the pressure sensing capacitor may change. As a result, it is able to detect a size of a force applied to the touch display substrate, thereby to achieve the pressure sensing function.

According to the touch display substrate in the embodiments of the present disclosure, it is able to achieve the touch function, the pressure sensing function and the display function at the same time, provide the touch display substrate integrated with the pressure sensing function, and simplify the production and assembling of the touch display product.

The present disclosure further provides in some embodiments a method for manufacturing a touch display substrate, including steps of: forming the flexible substrate using the above-mentioned method; and forming a display function layer on the flexible substrate, and/or forming a touch electrode layer on the display function layer.

According to the method in the embodiments of the present disclosure, the pressure sensing electrode is arranged between the two flexible base substrates, and the display function layer and/or the touch electrode layer are formed on the flexible substrate, so as to achieve a touch function, a pressure sensing function and a display function at the same time, provide a touch display substrate integrated with the pressure sensing function, and simplify the manufacture and assembling of a touch display product.

In a possible embodiment of the present disclosure, the display function layer includes a TFT and an organic light-emitting layer. The step of forming the display function layer on the flexible substrate includes: forming a third buffer layer on the flexible substrate; forming an active layer of the TFT on the third buffer layer; forming a gate insulation layer; forming a gate electrode of the TFT on the gate insulation layer; forming an intermediate insulation layer; forming a via-hole in the intermediate insulation layer to expose the first pressure sensing electrode and/or a lead of the first pressure sensing electrode; and forming a source electrode and a drain electrode of the TFT and a display voltage signal line on the intermediate insulation layer, the display voltage signal line being electrically connected to the first pressure sensing electrode through the via-hole.

In the embodiments of the present disclosure, the display voltage signal line connected to the TFT is electrically connected to the first pressure sensing electrode through the via-hole. In this way, the TFT is connected to the first pressure sensing electrode via the display voltage signal line, and meanwhile a pressure sensing circuit is integrated into a display driving circuit. During a subsequent bonding process, it is able for the pressure sensing circuit and the display driving circuit to be electrically connected to the touch display substrate merely through a single bonding operation.

To be specific, the display voltage signal line may be connected to the lead of the first pressure sensing electrode, or directly connected to the first pressure sensing electrode.

Of course, the first pressure sensing electrode may not be connected to the display voltage signal line, and instead, a specific signal line may be connected to the first pressure sensing electrode in the case of forming the TFT.

Figure 3:
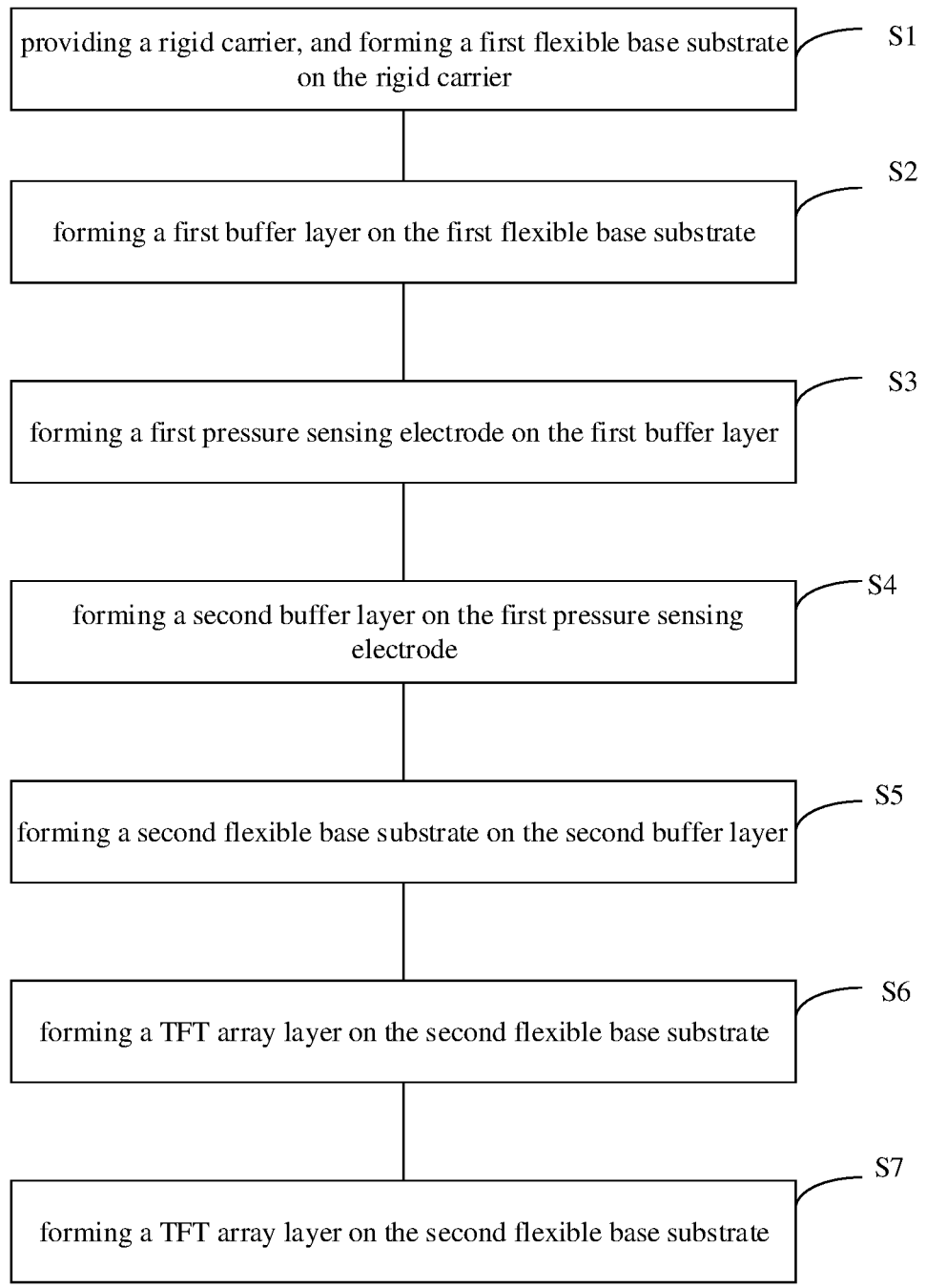
FIG. 3 is a flow chart of a method for manufacturing the touch display device according to one embodiment of the present disclosure.
Figure 4:
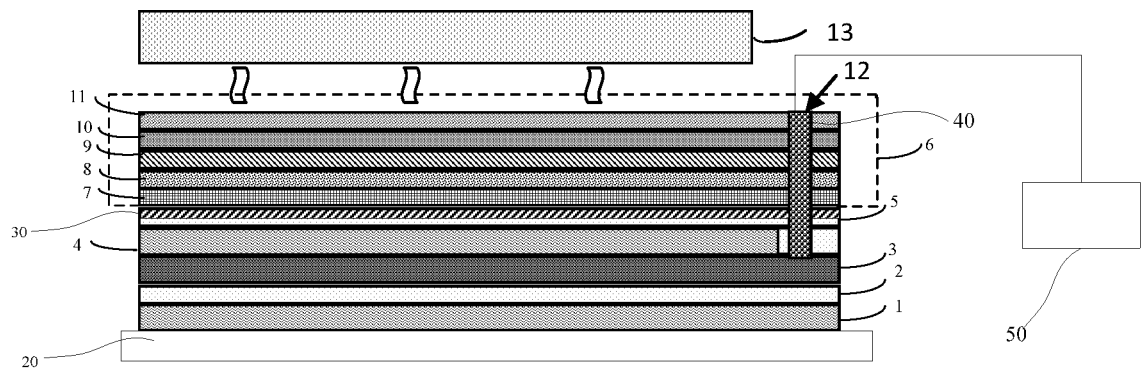
FIG. 4 is another schematic view showing the touch display substrate according to one embodiment of the present disclosure.

To be specific, as shown in FIGS. 3 and 4, the method for manufacturing the touch display substrate may include the following steps S1 to S7.

Step S1: providing a rigid carrier 20, and forming the first flexible base substrate 1 on the rigid carrier. To be specific, the rigid carrier may be a glass substrate or a quartz substrate. PI may be applied onto the rigid carrier so as to form the first flexible base substrate 1 having a thickness of 50000Å to 100000Å.

Step S2: forming the first buffer layer 2 on the first flexible base substrate 1. To be specific, the first buffer layer having a thickness of 4000Å may be deposited onto the first flexible base substrate 1 through Plasma Enhanced Chemical Vapor Deposition (PECVD). The first buffer layer may be a SiNx layer, a SiOx layer or a combination thereof.

Step S3: forming the first pressure sensing electrode 3 on the first buffer layer 2. To be specific, in Step S3, a metal layer having a thickness of about 500Å to 4000Å may be deposited onto the first buffer layer 2 through sputtering or thermal evaporation. The metal layer may be made of copper (Cu), Al, silver (Ag), Mo, chromium (Cr), neodymium (Nd), nickel (Ni), manganese (Mn), Ti, tantalum (Ta), tungsten (W), or an alloy thereof. The metal layer may be of a single-layered structure, or a multi-layered structure such as Cu/Mo, Ti/Cu/Ti or Mo/Al/Mo. A photoresist may be applied onto the metal layer, and then exposed using a mask plate, so as to form a photoresist reserved region corresponding to a region where a pattern of the first pressure sensing electrode is located, and a photoresist unreserved region corresponding to the other region. Next, the exposed photoresist region may be subjected to development, so as to fully remove the photoresist at the photoresist unreserved region, and maintain a thickness of the photoresist at the photoresist reserved region. Finally, the metal layer at the photoresist unreserved region may be fully etched off through an etching process, and the remaining photoresist may be removed, so as to form the pattern of the first pressure sensing electrode.

Step S4: forming the second buffer layer 4 on the first pressure sensing electrode 3. To be specific, the second buffer layer having a thickness of 4000Å may be deposited onto the first pressure sensing electrode 3 through PECVD, and it may be a SiNx layer, a SiOx layer or a combination thereof.

Step S5: forming the second flexible base substrate 5 on the second buffer layer 4. To be specific, PI may be applied onto the second buffer layer 4 so as to form the second flexible base substrate 5 having a thickness of 50000Å to 100000Å.

Step S6: forming the TFT array layer 6 on the second flexible base substrate 5. To be specific, a third buffer layer 30 having a thickness of 4000Å may be deposited onto the second flexible base substrate 5 through PECVD, and it may be a SiNx layer, a SiOx layer or a combination thereof. Then, the TFT array layer 6 may be formed on the third buffer layer.

The TFT array layer 6 may include the active layer 7, the gate insulation layer 8, the gate metal layer 9, the intermediate insulation layer 10 and the source-drain metal layer 11. After the formation of the intermediate insulation layer 10, it is necessary to form a via-hole 40 to expose the lead of the first pressure sensing electrode or the first pressure sensing electrode. Next, when forming the source-drain metal layer 11, the source-drain metal layer 11 may be used to form the source electrode and the drain electrode of the TFT as well as data lines. In addition, the source-drain metal layer 11 in the via-hole may also be used to form the conductive connection line 12 electrically connected to the first pressure sensing electrode 3.

Step S7: forming the organic light-emitting layer and the touch electrode layer 13 on the TFT array layer 6. The formation of the organic light-emitting layer and the touch electrode layer 13 is known in the art, and thus will not be particularly defined herein.

The touch display substrate in the embodiments of the present disclosure may be acquired through the above Steps S1 to S7. In addition, after the formation of the touch display substrate, it may be separated from the rigid carrier. According to the touch display substrate in the embodiments of the present disclosure, it is able to achieve the touch function, the pressure sensing function and the display function at the same time, provide the touch display substrate integrated with the pressure sensing function, and simplify the production and assembling of the touch display product.

The present disclosure further provides in some embodiments a touch display device including the above-mentioned touch display substrate and a display driving circuit 50 for providing a display voltage signal to the touch display substrate. The touch display device may be any product or member having a display function, e.g., liquid crystal television, liquid crystal display, digital photo frame, mobile phone or flat-panel computer. The touch display device may further include a flexible circuit board, a printed circuit board and a back plate.

In a possible embodiment of the present disclosure, when a display voltage signal line connected to a TFT of a display function layer is electrically connected to a first pressure sensing electrode through a via-hole, the display driving circuit may be multiplexed as a pressure sensing circuit capable of providing a pressure sensing voltage signal to the first pressure sensing signal. In this way, the TFT is connected to the first pressure sensing electrode via the display voltage signal line, and meanwhile a pressure sensing circuit is integrated into a display driving circuit. During a subsequent bonding process, it is able for the pressure sensing circuit and the display driving circuit to be electrically connected to the touch display substrate merely through a single bonding operation.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other substrate, or an intermediate element may be arranged therebetween.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch display substrate, comprising a flexible substrate, at least one of a display function layer or a touch electrode layer arranged on the flexible substrate, wherein
the flexible substrate comprises: a first flexible base substrate; a first buffer layer arranged on the first flexible base substrate; a first pressure sensing electrode arranged on a surface of the first buffer layer away from the first flexible base substrate; and a second flexible base substrate covering the first pressure sensing electrode,
the touch display substrate further comprises a second pressure sensing electrode capable of forming a pressure sensing capacitor with the first pressure sensing electrode and arranged at a side of the second flexible base substrate away from the first pressure sensing electrode,
the second pressure sensing electrode is a ground shielding electrode,
the first pressure sensing electrode and the second pressure sensing electrode are arranged at a bottom side of the display function layer,
a display voltage signal line is arranged in the display function layer and is electrically connected to the first pressure sensing electrode through a via-hole.

2. The touch display substrate according to claim 1, wherein the display function layer comprises a thin film transistor (TFT) and an organic light-emitting layer, and the display voltage signal line is connected to the TFT.

3. A touch display device, comprising the touch display substrate according to claim 2, and a display driving circuit for providing a display voltage signal to the touch display substrate.

4. A touch display device, comprising the touch display substrate according to claim 1, and a display driving circuit for providing a display voltage signal to the touch display substrate.

5. The touch display device according to claim 4, wherein the display voltage signal line is connected to a TFT of a display function layer, and the display driving circuit is multiplexed as a pressure sensing circuit capable of providing a pressure sensing voltage signal to the first pressure sensing electrode.

6. The touch display substrate according to claim 1, wherein the flexible substrate further comprises a second buffer layer arranged between the first pressure sensing electrode and the second flexible base substrate.

7. A method for manufacturing a touch display substrate including a flexible substrate, comprising steps of:
forming a first flexible base substrate on a rigid carrier;
forming a first buffer layer on the first flexible base substrate;
forming a first pressure sensing electrode on the first buffer layer;
forming a second flexible base substrate covering the first pressure sensing electrode; and
the method further comprises:
forming a display function layer on the flexible substrate,
wherein the second pressure sensing electrode is a ground shielding electrode,
the first pressure sensing electrode and the second pressure sensing electrode are arranged at a bottom side of the display function layer,
a display voltage signal line is arranged in the display function layer and is electrically connected to the first pressure sensing electrode through a via-hole.

8. The method according to claim 7, further comprising forming a touch electrode layer on the display function layer.

9. The method according to claim 7, wherein the display function layer comprises a thin film transistor (TFT) and an organic light-emitting layer,
wherein the step of forming the display function layer on the flexible substrate comprises:
forming a third buffer layer on the flexible substrate;
forming an active layer of the TFT on the third buffer layer;
forming a gate insulation layer;
forming a gate electrode of the TFT on the gate insulation layer;
forming an intermediate insulation layer;
forming a via-hole in the intermediate insulation layer to expose at least one of the first pressure sensing electrode or a lead of the first pressure sensing electrode; and
forming a source electrode and a drain electrode of the TFT and a display voltage signal line on the intermediate insulation layer, the display voltage signal line being electrically connected to the first pressure sensing electrode through the via-hole.

10. The method according to claim 7, wherein prior to the step of forming the second flexible base substrate covering the first pressure sensing electrode, the method further comprises forming a second buffer layer covering the first pressure sensing electrode, wherein the step of forming the second flexible base substrate covering the first pressure sensing electrode comprises forming the second flexible base substrate on the second buffer layer.

11. The method according to claim 7, further comprising removing the rigid carrier.

* * * * *